United States Patent [19]

Kubicek

[11] 3,975,111

[45] Aug. 17, 1976

[54] COMBINATION EXTENSION AND COMPRESSION TOOL HOLDER

[76] Inventor: Louis A. Kubicek, 2124 Lake View, Ypsilanti, Mich. 48197

[22] Filed: Jan. 27, 1975

[21] Appl. No.: 544,126

[52] U.S. Cl. ............................ 408/239 R; 408/714; 408/226; 279/16
[51] Int. Cl.² .......................................... B23B 51/16
[58] Field of Search .......... 408/239, 714, 154, 157, 408/156, 163, 141, 226, 228; 279/16

[56] References Cited
UNITED STATES PATENTS

| | | | |
|---|---|---|---|
| 3,178,739 | 4/1965 | Plummer et al. ................ | 408/239 X |
| 3,658,435 | 4/1972 | Kubicek ............................ | 408/239 |
| 3,661,473 | 5/1972 | Kubicek ............................ | 408/239 |
| 3,761,104 | 9/1973 | Kubicek ............................ | 408/141 |

*Primary Examiner*—Donald R. Schran
*Attorney, Agent, or Firm*—Gifford, Chandler & Sheridan

[57] ABSTRACT

A combination extension and compression tool holder having a cylindrical outer housing adapted to be inserted into a chuck of a rotary drive machine. A tool holding rod is axially slidably mounted in a cylindrical recess formed in the housing for rotation about its axis of elongation. Two opposing helical springs are disposed within the cylindrical recess and bias the tool holding rod towards an intermediate position within the cylindrical recess. During the feed-in of the machine chuck during a deburring operation, one of the helical springs can be compressed to permit the deburring tool to be retracted when the deburring tool engages an unfinished hole resulting from drill breakage to thereby prevent the deburring tool from being forced into the unfinished hole and thereby broken. During the deburring operation of a normally formed hole, the compression spring will permit the deburring tool to dwell at the opening of the hole for a better deburring operation. When the deburring tool is retracted from a normally formed hole, the extension helical spring will compress and permit the deburring tool to dwell at the edge of the hole to adequately debur the workpiece.

3 Claims, 6 Drawing Figures

U.S. Patent   Aug. 17, 1976   3,975,111
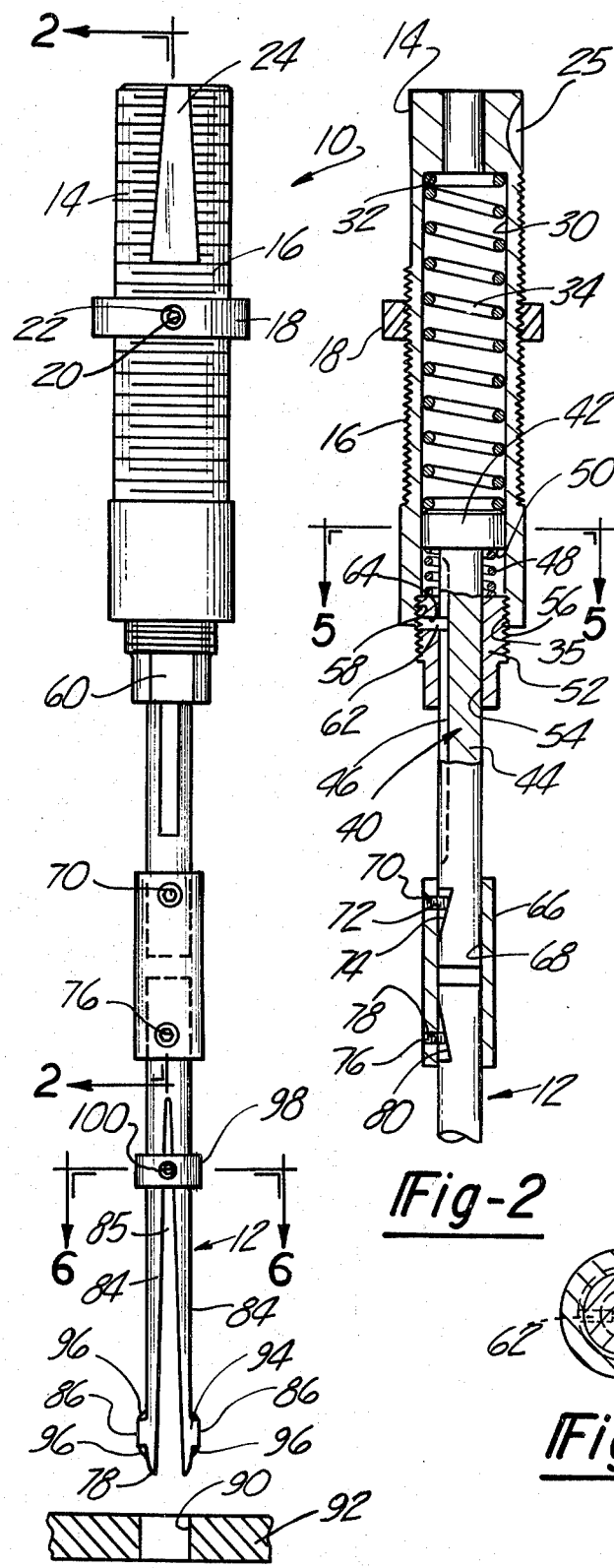
Fig-1
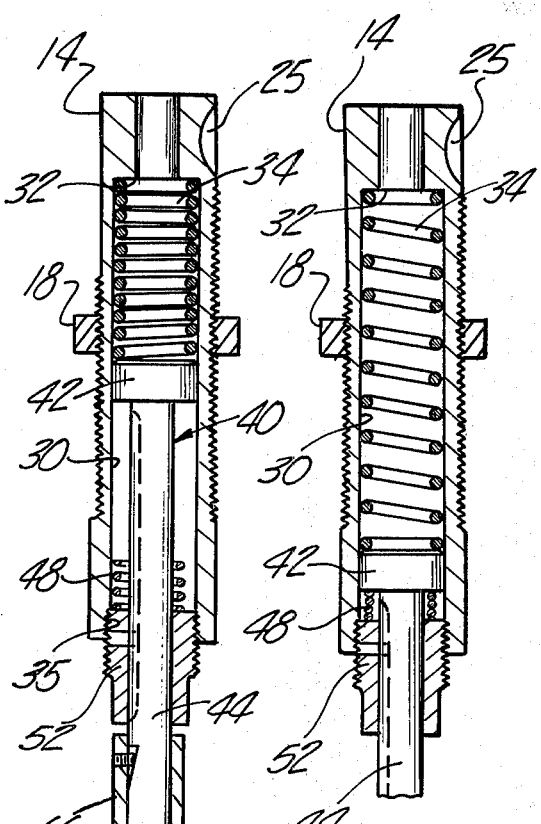
Fig-2
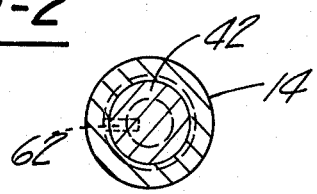
Fig-5
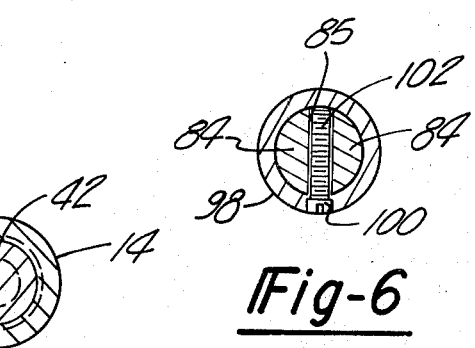
Fig-3
Fig-4
Fig-6

COMBINATION EXTENSION AND COMPRESSION TOOL HOLDER

BACKGROUND OF THE INVENTION

I. Field of the Invention

The present invention relates generally to tool holders and, more particularly, to a combination extension and compression tool holder.

II. Description of the Prior Art

Compression tool holders, such as that disclosed in U.S. Pat. No. 3,658,435 issued on Apr. 25, 1972, are well known and have enjoyed great commercial success in the trade. Such compression tool holders permit the tool, typically a deburring tool, to be retracted relative to the tool holder. Compression tool holders have been found to be particularly useful when used in conjunction with deburring tools. Thus, when the tool holder with a deburring tool is advanced towards an improperly formed workpiece aperture, the deburring tool will retract into the tool holder, thus preventing the deburring tool from being forced into an unfinished hole and thereby broken. Compression tool holders are also particularly useful with deburring tools in that the deburring tool will retract slightly into the tool holder, thereby permitting the deburring tool to dwell at the edge of the workpiece hole to adequately debur the workpiece.

Extension tool holders, such as that described in U.S. Pat. No. 3,761,104 issued on Sept. 25, 1973, have also enjoyed wide acceptance and great commercial success in the trade. Such extension tool holders have also proven to be particularly useful for use in conjunction with deburring tools. During the backstroke of the machine chuck in the deburring of holes, the extension spring compresses due to the engagement of the cutting edge of the deburring tool and the edge of the hole being deburred, allowing the deburring tool to dwell at the back edge of the hole to adequately debur the workpiece.

Although both the previously known compression tool holders and the previously known extension tool holders achieve highly advantageous characteristics, no previously known tool holder has provided for a combination compression and extension tool holder. Therefore, it is the primary object of the present invention to provide a combination compression and extension tool holder.

SUMMARY OF THE PRESENT INVENTION

The present invention provides a combination compression and extension tool holder. The tool holder has a cylindrical outer housing adapted to be inserted into a chuck of a rotary drive machine. A cylindrical recess is formed in the housing and a helical spring is inserted into the recess. A tool holding rod having an enlarged diameter portion is then inserted into the cylindrical recess so that the enlarged diameter portion is axially slidably received in the cylindrical recess. The elongated reduced diameter portion of the tool holding rod extends axially out from the cylindrical recess in the housing. An extension spring and a cap having a central bore are then inserted over the elongated portion of the tool holding rod and the cap is secured to the housing so that the enlarged diameter portion of the tool holding rod is sandwiched between the compression spring and the extension spring. A collet is then secured onto the outwardly extending end of the reduced portion of the tool holding rod for attaching a deburring tool thereto.

In operation, as the tool holder with the attached tool is advanced towards the workpiece with an improperly formed aperture therethrough, the tool holding rod will compress the compression spring and prevent the tool from breaking. As the deburring tool is retracted from a properly formed workpiece aperture, the extension spring compresses as the cutting edges of the deburring tool engage the rear surface of the aperture, thereby causing the deburring tool to dwell at the edge of the hole to adequately debur the workpiece.

BRIEF DESCRIPTION OF THE DRAWINGS

The tool holder of the present invention will be more clearly understood by reference to the following detailed description when read in conjunction with the accompanying drawings, wherein like reference characters refer to like parts throughout the several views, and in which:

FIG. 1 is a front plan view showing the tool holder of the present invention with a deburring tool attached thereto;

FIG. 2 is a cross-sectional view of the tool holder of the present invention taken along line 2—2 in FIG. 1;

FIG. 3 is a cross-sectional view similar to FIG. 2 but showing the tool holder of the present invention in a state of compression;

FIG. 4 is a cross-sectional view similar to FIG. 2 but showing the tool holder in the state of extension;

FIG. 5 is a cross-sectional view of the present invention taken along line 5—5 in FIG. 2; and FIG. 6 is a cross-sectional view taken along line 6—6 in FIG. 1.

DETAILED DESCRIPTION

Referring to FIG. 1, a tool holder, generally indicated at 10, is adapted to carry a deburring tool 12 so that both the tool holder 10 and the deburring tool 12 are rotated about their axes of elongation by the chuck of a suitable rotary drive machine (not shown).

The tool holder 10 includes an outer cylindrical housing 14 which has threads 16 formed along its outer surface for receiving an adjustment collar 18 screwed thereon. The adjustment collar 18 is provided with a set screw 20 threaded into an aperture 22 formed therein for axially positioning the collar 18 along the housing 14. When the housing 14 is inserted into the chuck of a rotary drive machine, the collar 18 engages the front surface of the chuck to axially position the housing 14 in the chuck.

A portion of the threads 16 are ground away to provide a flat surface 24 which receives a set screw carried by the chuck of the rotary drive machine to secure the outer housing 14 in the chuck. A Woodruff key slot 25 may also be formed in the housing 14 adjacent its rear end 28. The slot 25 would receive a Woodruff key (not shown) carried by the machine chuck for rotatably driving the outer housing 14 about its axis of elongation.

Referring now to FIG. 2, a cylindrical recess 30 is formed in the housing 14 parallel to and coaxial with the axis of elongation of the housing 14. The recess 30 thus has a closed circular end 32 and a lower circular opening 35. A helical compression spring 34 is disposed in the recess 30 so that one end of the spring 34 abuts against the end 32 of the cylindrical recess 30. A tool holding rod 40 is generally elongated in shape and has a generally cylindrical cross-sectional area. The tool holding rod 40 has an upper enlarged diameter portion 42 which is axially slidably received in the recess 30 and a downwardly extending reduced diameter portion 44 which extends axially outwardly through the opening 35 of the cylindrical recess 30. A groove 56 having a square cross-sectional area is formed along one side of the reduced diameter portion 44 of the rod 40 for a purpose which will be shortly understood.

An extension spring 48 is disposed over the reduced portion 44 of the rod 40 so that the upper end of the spring 48 abuts against the annular surface 50 formed by the junction of the enlarged diameter portion 42 and the reduced diameter portion 44 of the rod 40. A cap 52 is provided to enclose the springs 34 and 48 and the enlarged diameter portion 42 of the rod 40 within the cylindrical recess 30. An axial bore 54 is provided through the cap 52 for receiving the reduced diameter portion 44 of the rod 40 therethrough. The cap 52 is provided with external threads 56 adapted to threadably engage internal threads 58 on the lower end of the cylindrical recess 30. It can thus be seen that the cap 52 may be secured to the housing 14 by simply screwing the cap 52 into the housing 14. To facilitate the assembly of the cap 52 onto the housing 14, the cap is preferably provided with a pair of spaced and parallel flats 60 (only one of which is shown) so that a wrench may be used to tighten the cap 52 into the housing 14.

In order to prevent rotation of the housing relative to the tool holding rod 40, a pin 62 is provided in a traverse bore 64 in the cap 52. The pin 62 projects into the longitudinal groove 46 formed along the tool holding rod 40, thereby preventing rotation of the rod 40 relative to the cap 52. Although the pin 62 may threadably engage the bore 64, it is not necessary that the pin 62 be threaded since the pin 62 is entrapped between the wall of the recess 30 and the base of the groove 46. It can thus be seen that while the pin 62 prevents rotational movement of the tool holding rod 40 relative to the housing 14, since the pin 62 may slide along the length of the groove 46, the pin 62 in no way interferes with the axial movement of the tool holding rod 40 relative to the housing 14. A cylindrical collet 66 has an axial bore 68 therethrough which is adapted to receive the downwardly extending end of the reduced portion 44 of the rod 40. A set screw 70 is threadably engaged in a traverse bore 72 in the collet 66 and abuts against the flat 74 in the rod 40 to secure the collet 66 onto the rod 40. Similarly, a second set screw 76 threadably engages a bore 78 and abuts a flat 80 in the tool 12 to secure the tool 12 to the collet 66.

The deburring tool 12, as illustrated in FIGS. 1 and 6 and as shown and described in more detail in U.S. Pat. No. 3,230,798, issued Jan. 25, 1966, is preferably formed with a longitudinally extending tension slot 85 forming a pair of substantially parallel and symmetrical support columns 84. Substantially arcuate cutting edges or lobes 86 are preferably formed on the periphery of each of the support columns 84. The cutting ridges 86 are spaced axially somewhat from the free ends of the support columns 84 to form a pilot portion 88 to aid in the insertion of the deburring tool 12 into the hole 90 of the workpiece 92 to be deburred. The cutting ridges 86 are provided with substantially radially extending flat surface portions 94. These are disposed in substantially parallel planes on opposite sides of the deburring tool 12 and provide sharp cutting edges 96 at each side of the ridges 86.

A collar 98 is slidably mounted around the support columns 84 and retained in position by means of a set screw 100 integrally carrying the pin disposed to extend inwardly into the tension slot 85. When the set screw 100 is tightened against the other surfaces of the support columns 84, the pin 102 provides a fulcrum for the support columns 84 at the point of adjustment so that the flexibility of the support columns will depend upon the longitudinal position of the collar 98.

The combination compression and extension tool holder 10 of the present invention has proven to be particularly useful for use with the deburring tool 112 described in the aforementioned U.S. Pat. No. 3,230,798 as will be more clearly understood as the operation of the present invention is now described. As the tool holder 10 with the attached deburring tool 12 is advanced towards a workpiece aperture 90, the lower cutting edges 96 will engage the workpiece aperture and cause the compression spring 34 to slightly compress, thereby permitting the deburring tool 12 to dwell momentarily at the entrance of the aperture 90 thereby providing a longer and thus more adequate deburring operation. In the situation where the workpiece aperture 90 is improperly formed, the tool holding rod 40 will retract into the housing 14, compressing the compression spring 34, as shown in FIG. 3. In this manner, the compression feature of the tool holder 10 of the present invention protects the deburring tool 12 from breakage. When the tool holder 10 is withdrawn from the workpiece, the compression spring 34 will expand and return the tool holding rod 40 to its at-rest position illustrated in FIG. 2.

Assuming that the workpiece aperture 90 is properly formed through the workpiece 92, as the deburring tool 12 extends through the aperture 90 the upper sharp edges 96 of the deburring tool 12 will contact and debur the rear surface of the aperture 90. As the tool holder 10 is withdrawn from the workpiece, the extension spring 48 will compress, as shown in FIG. 4, thereby permitting the cutting edges 96 of the tool 12 to dwell momentarily on the rear side of the aperture 90, thus providing a more adequate deburring operation.

The tool holder 10 of the present invention enjoys great flexibility in that not only may the stiffness of the compression spring 34 and the extension spring 48 be varied as desired, but also the relative length of the springs 34 and 48 may be varied. For example, in FIGS. 2–4, the compression spring 34 is illustrated as being considerably longer than the extension spring 48. However, it will be appreciated by those skilled in the art that the relative length of the springs 34 and 48 may be varied in any desired manner to obtain the particular compression and extension tool holder characteristics desired for a given machine operation. It should also be apparent to those skilled in the art that other resilient means, such as for example a rubber insert, may be utilized instead of the springs 34 and 48 without deviating from the spirit or scope of the invention.

Having thus described my invention, many modifications thereto will become apparent to those skilled in the art to which the invention pertains without deviating from the spirit of the invention as defined by the scope of the appended claims.

What is claimed is:

1. The combination of a tool holder and a deburring tool, comprising:
   a housing having a recess formed therein;

a tool holding rod having an enlarged portion slidably mounted in said recess and an elongated reduced portion extending outwardly from said recess;

a first resilient means disposed in said recess and biasing said enlarged portion of said rod axially outwardly from said recess;

a cap for closing said recess, said cap having an aperture for receiving the reduced portion of said rod therethrough;

a second resilient means disposed between said cap and said enlarged portion of said rod for biasing said rod axially inwardly into said recess;

means to prevent rotation of said rod relative to said housing while permitting axial movement of said rod relative to said housing;

means for attaching the deburring tool to said reduced portion of said tool holding rod, whereby said first resilient means permits said deburring tool to retract relative to said housing and said second resilient means permits said deburring tool to outwardly extend relative to said housing and wherein the axial compressive force of said first resilient means is substantially greater than and occupies more space than the axial compressive force of said second resilient means so as to provide space for receiving the tool holding rod within the recess when an imperfectly formed hole is encountered by said tool.

2. The tool holder defined in claim 1 wherein said first and second resilient means are helical springs.

3. The tool holder defined in claim 1 wherein said reduced portion of said rod includes a longitudinal groove formed along one side of said rod and said means to prevent rotation of said rod relative to said housing comprises a pin carried by said cap and projecting into said groove.

* * * * *